United States Patent [19]

Bellucco et al.

[11] Patent Number: 5,524,085
[45] Date of Patent: Jun. 4, 1996

[54] MULTIMEDIA JOB TICKETS FOR PRINTING MACHINES

[75] Inventors: Thomas M. Bellucco, Webster; Samuel A. Fedele, Rochester, both of N.Y.

[73] Assignee: Xerox Corporation, Stamford, Conn.

[21] Appl. No.: 304,329

[22] Filed: Sep. 12, 1994

[51] Int. Cl.⁶ ........................... G07B 3/02
[52] U.S. Cl. ........................ 364/514 C; 101/66
[58] Field of Search .................... 355/202, 204, 355/309, 112; 358/401, 296; 271/298; 364/514 C; 101/66

[56] References Cited

U.S. PATENT DOCUMENTS

| | | | |
|---|---|---|---|
| 4,970,554 | 11/1990 | Rourke | 355/202 |
| 5,049,931 | 9/1991 | Knodt | 355/209 |
| 5,095,369 | 3/1992 | Ortiz et al. | 358/296 |
| 5,130,806 | 7/1992 | Reed et al. | 358/296 |
| 5,164,842 | 11/1992 | Gaurouski et al. | 358/401 |
| 5,206,735 | 4/1993 | Gaurouski et al. | 358/296 |
| 5,221,973 | 6/1993 | Miller et al. | 358/468 |
| 5,243,381 | 9/1993 | Hube | 355/204 |
| 5,245,368 | 9/1993 | Farrell et al. | 358/401 |
| 5,435,544 | 7/1995 | Mandel | 271/298 |

*Primary Examiner*—Emanuel T. Voeltz
*Assistant Examiner*—Thomas Peeso
*Attorney, Agent, or Firm*—R. Hutter

[57] ABSTRACT

A system enables multimedia messages, such as audio messages, to accompany print jobs sent from a remote workstation to a central printer. Each print job includes the data to be printed, job ticket data, and multimedia data. The job ticket data is maintained on a queue, and when the job is ready to be printed, the multimedia data is activated.

16 Claims, 2 Drawing Sheets

MULTIMEDIA JOB TICKETS FOR PRINTING MACHINES

The present application incorporates by reference U.S. Pat. No. 5,130,806, and U.S. Pat. No. 5,226,112, both assigned to the assignee hereof.

The present invention relates to a system for incorporating multimedia data in job instructions in a networked printing system.

In practical applications of high-speed, high-volume printing machines, the printing apparatus exists on a network where it may be electronically accessible to a large number of potential users. Individual users on the network (for example, at workstations or personal computers) send data representing images to be printed to the printing apparatus as needed. Typically, this data for each job is accompanied by a "job ticket," which is a set of data which identifies a quantity of print data as a single job, and which may also include identifying information such as the source of the print data, the time the print data was sent to the printer, and so forth. Very often, the data on this job ticket will also include "special instructions" specific to the particular job, which are intended to be instructions directly to a human system operator who may be at the printing apparatus. For example, a job ticket may contain special instructions such as "Bind the printed books in blue covers," "Do not print this until Monday," "Send the finished booklets to this address," etc. These special instructions are intended to be read, as on a screen, by the human operator of the printing machine. In some systems, the print data will not be allowed to be printed on the machine until this special instruction data is displayed to the human operator.

In the publishing system made by the Xerox Corporation under the trade name "DocuTech," the job ticket provides space for 100 alphanumeric characters to be used as special instructions. However, it has been found that customers would prefer even more space associated with the job ticket conveying special instructions; further, certain customers may not wish to type in special instructions, but would rather convey these instructions in another manner.

U.S. Pat. No. 5,049,931 discloses a system for providing operator prompts and selectable features for programming the operation of a printing machine.

U.S. Pat. No. 5,130,806 discloses a system that allows the sending of messages with a print job from remote user workstations to the central printing machine. The messages are displayed on a user interface, such as a video monitor.

U.S. Pat. No. 5,221,973 discloses a reprographic system having a number of devices or subsystems. The various devices are connected by a communications link which enables communication of the status or control states of the devices. As part of the diagnostic process, audio signals can be emitted in response to state changes in various devices.

According to one aspect of the present invention, there is provided a method and system for processing a job received at a processing station, the job comprising data to be processed, job ticket data associated with the data to be processed, and a multimedia data set. The job ticket data is placed in a queue memory, and the data to be processed is placed in a main memory. The data to be processed is transferred to the processing station in response to the job ticket data being activated in the queue memory. The multimedia data set is activated in response to the data to be processed being transferred to the processing station.

According to another aspect of the present invention, there is provided a method of processing data in the form of a page description language file. A data string operable of a multimedia device is provided in the page description language file. The data string is applied to a multimedia device. A portion of the data excluding the data string is applied to a printing apparatus.

Figure 1:
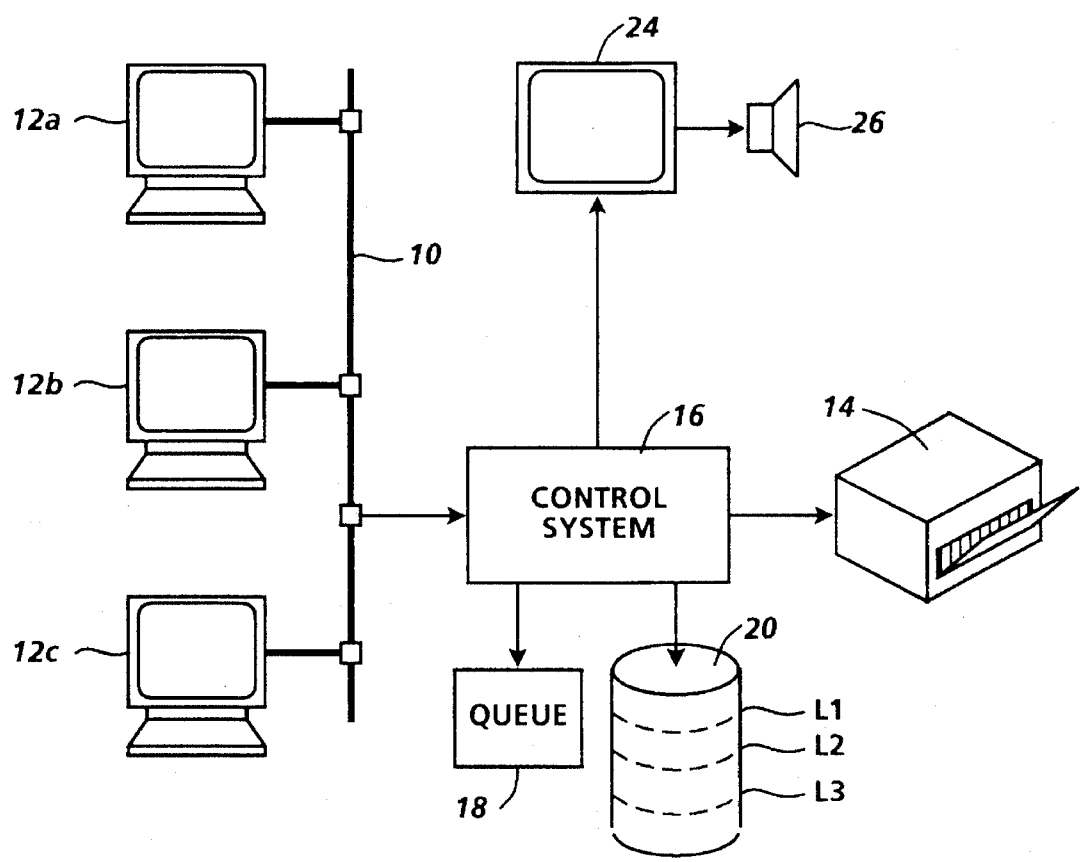
FIG. 1 is a systems diagram showing the arrangement of the main elements of a network printing system incorporating the present invention.

FIG. 1 is a systems diagram showing the basic elements of a network printing system wherein a plurality of users, acting at remote workstations, may access a shared printing apparatus. In the Figure, there is shown only those elements of the system which are directly relevant to the present invention; a more detailed plan of such a system is described in, for example, U.S. Pat. No. 5,226,112, assigned to the assignee hereof, and incorporated herein by reference. There exists a network bus 10 upon which remote workstations 12a, 12b, and 12c, may operate. A well-known system for allowing the various workstations to convey data along a bus is the "Ethernet" protocol. The users of the workstations 12a, 12b, and 12c may at various times wish to transfer data from their respective workstations so that the data may be printed out on a printing apparatus such as 14. Printing apparatus 14 may be of any type, such as electrophotographic or ink-jet.

Interposed between the network bus 10 and the printing apparatus 14 is a control system generally indicated as 16. This control system 16 may be the nucleus of a "server" as described, for example, in the patent incorporated by reference. The purpose of the control system 16 is to oversee the queueing of various print jobs which arrive through the network bus 10 from the various remote workstations 12a–c. As the printing apparatus 14 is capable only of performing printing jobs one at a time, it is important that the print data of incoming jobs be retained in an organized fashion until the data is ready to be applied to the printing apparatus 14. In the preferred embodiment of the present invention, the control system 16 operates on both a queue memory 18 and a print data memory 20. These two memories operate independently, although they may be incorporated in a single physical apparatus, such as a random-access memory or hard-drive disk.

According to a system-wide protocol, each job containing print data to be printed comprises, in addition to the print data which is used to form the actual images (either text characters or graphics) to be printed, an additional set of job ticket data. When a job to be printed arrives from one of the workstations over the bus 10 into the control system 16, control system 16 separates the job ticket data from the print data. The job ticket data is sent to queue memory 18, while the print data is sent to a specific well-known location, such as L1, L2, or L3, in the print data memory 20. The job ticket data, which identifies the print data as a particular job, is small in size, typically much less than the equivalent of one page of text. Jobs in print data memory 20, however, can be of a wide range of sizes, from less than one page to hundreds of pages. In brief, the job tickets in queue memory 18 are used to "stand in line" for the printing apparatus 14. As the job tickets are relatively small and of generally equal size, the data sets for the job tickets in queue memory 18 can be easily polled or otherwise controlled for a queueing process. Very often, in practical applications, the control system 16 may also be connected to a monitor 24, which can display the titles of jobs to be printed which are currently in the queue memory 18, for the benefit of the operator at the printing machine. There may also conceivably be included some audio means associated with the monitor 24, such as speaker 26.

As jobs to be printed come off the bus 10, the job tickets are placed in a given order (which may reflect a prioritizing system) in queue memory 18, while the associated print data for each job ticket is placed at known locations in the print data memory 20. As the printing apparatus 14 becomes available, control system 16 goes through the list of job tickets in the queue memory 18 and selects a job for printing. Once a job ticket in queue memory 18 is selected, control system 16 retrieves the associated print data for the job ticket from the appropriate location in print data memory 20. The location of the print data can be added onto the job ticket data as part of the queueing process. Typically, data associated with both the job ticket and the print data are sent to the printing apparatus for printing, with the job ticket data typically appearing on a first "banner" page when the job is printed. Also, the job ticket associated with each job further includes provision for users at the workstations 12a–c to include special instructions to be either displayed on monitor 24 and/or printed on the banner page.

According to the present invention, there is provided a system for rendering this "special instructions" data in a "multimedia" format. As used in the specification and claims herein, "multimedia" shall be defined as data which is operable on an output device in real time. For example, multimedia data may include digital data which, when applied to a audio synthesizer and a speaker, is capable of producing a specific audio signal directly related to the data; alternately or in addition, the multimedia data may be operable on a graphics program for creating a short motion picture directly related to the digital data.

Figure 2:
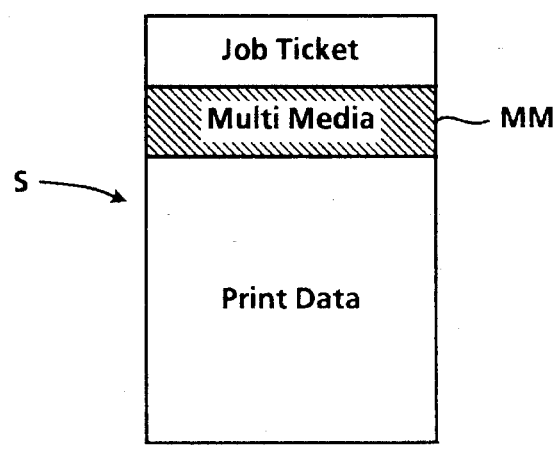
FIG. 2 is a diagram of a data set, including a job ticket and print data, that is received by the system of the present invention.

FIG. 2 shows the essential pieces of a data set corresponding to a particular job to be printed. The data set, indicated as S, comprises the data for the job ticket, and the print data, which is the data which will actually be applied to the printing apparatus 14 for printing the desired image, and which may be in the form of either pure binary data which could be used, for example, directly to operate an ink-jet printhead or a laser raster output scanner, but which is more typically in the form of a file in a predetermined page description language, or PDL. As is well known in the art of electronic publishing, PDL's are standard conventions for rendering data for generating text characters. Well known PDL's which are commercially available include PostScript, HP-PCL, and Interpress. Other well-known plans for organizing data for application to a printer, such as the CCITT Group 3 and 4 facsmile protocols, ASCII, and TIFF, are not strictly speaking "page description languages," but, for purposes of describing the present invention, serve in the same manner as PostScript or HP-PCL to organize digital data for use by a printing apparatus. As used in the claims herein, the phrase "page description language" should be construed to include any such organizational scheme for applying data to a printing apparatus, whether or not the scheme involves generating bitmaps for individual text characters. As used in the claims herein, a page description language file shall mean any set of data which is, apart from the special instructions and data particular to the present invention, understandable by a system (such as a PostScript or ASCII compiler, or a facsimile system) for applying the data in the file to a printing apparatus.

Also part of the data set S which forms an entire print job is a quantity of multimedia data indicated as MM. As shown in the Figure, this multimedia data can be construed as part of the job ticket or as part of the print data, in a manner which will be described in detail below. The essential feature of the multimedia data in the job ticket is that it is typically in the form of a string of binary data, such as 1's and 0's, which, when applied to a multimedia device, causes that device to produce as desired a short "show" of audio or video data. In the case of audio multimedia data, the multimedia data for one minute of audio at a useful sound resolution typically requires 400 to 500 kilobytes of memory, which is generally equivalent to 10 pages of text data for every minute of audio. Thus, while the multimedia data set is practically much longer than the average regular job ticket, its size can be manageable in the context of a high-volume printing system.

Figure 3:
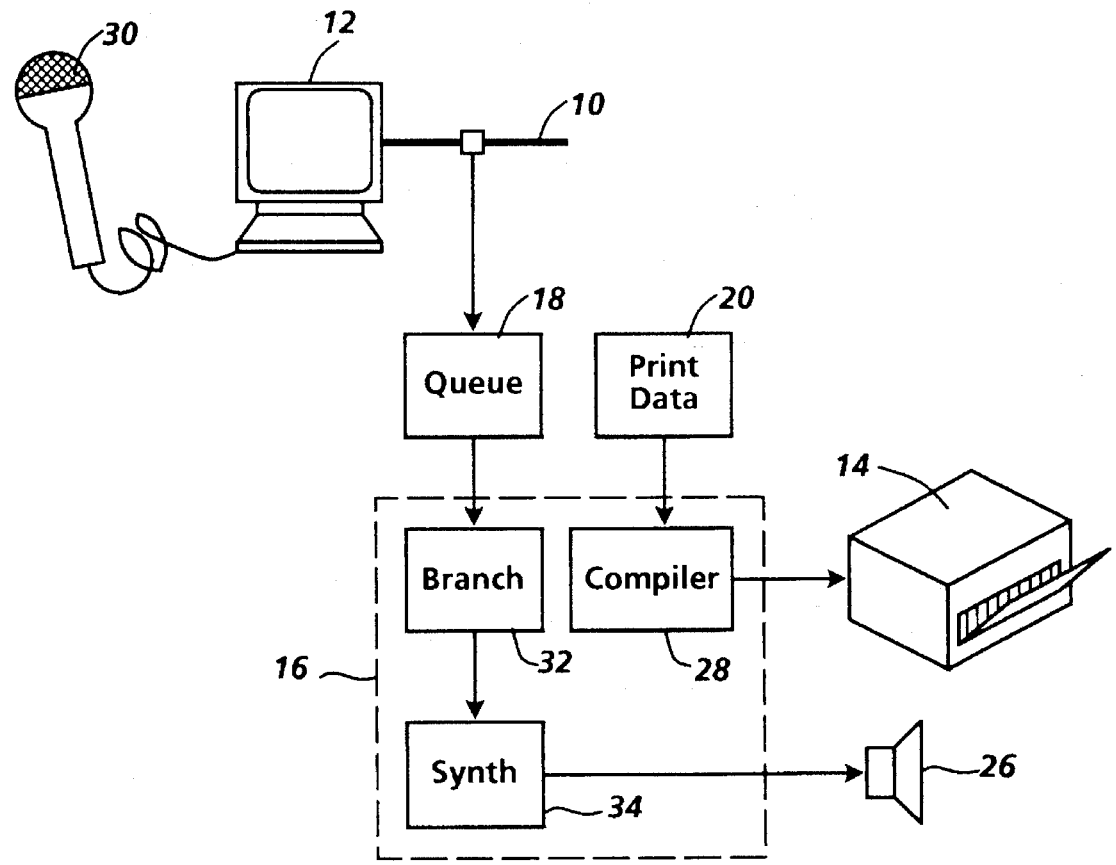
FIG. 3 is a systems diagram of the system of the present invention.

FIG. 3 is a systems diagram showing the basic elements of the portions of a network printing system, including the parts of control system 16 particularly relevant to the present invention. When a remote user, for example at workstation 12a, sends a quantity of data to the printer 14 via system controller 16 to be printed, the user sends the data through the bus 10, and may additionally wish to speak a minute of audio, for his special instructions, into a microphone 30 which is associated with the computer at his workstation 12a. Numerous systems for accepting audio data from a microphone into a computer system, and rendering the audio data as binary data, are commercially available. The job data set from the workstation 12 will thus contain both print data and the quantity of multimedia data associated with the minute of audio, in addition to the job ticket data itself. When this data set reaches the control system 16, the control system 16 divides the job data set, through means not shown, with the job ticket data going into queue memory 18 and the print data going into memory 20.

It is conceivable, with the present invention, to include the multimedia data as part of the job ticket data, in which case the multimedia data will be retained in queue memory 18 until the "turn" of the particular job ticket data comes up for printing. However, the multimedia data for even a minute of audio may be quite large, and retaining the multimedia memory in the queue memory 18 may be cumbersome. In a preferred embodiment of the invention, the job ticket only is retained in queue memory 18, while the multimedia data associated with the job is stored with the print data in print memory 20. When the turn of the particular job in queue memory 18 comes up for printing by the printer 14, the job ticket data becomes "activated" and the associated print data, with the multimedia data appended thereto, is retrieved from memory 20. In printing systems using page description languages, there is included a compiler, here shown as 28, which converts the PDL file into a stream of binary data directly usable by the hardware (such as a laser or ink-jet printhead) of printer 14. In the system of the present invention, there is further included, within control system 16, a "branching means" 32, which may be in the form of a set of instructions in the page description language compiler (although it is here shown separate from compiler 28) for detecting a special instruction within the PDL file forming the print data. This special instruction indicates that there exists within the PDL file a character string which should be construed not as data to be printed, but rather data to be used to activate a multimedia device. When this special instruction within the PDL file is detected in the job to be printed, the branching means 32 responds by temporarily halting the compilation of the PDL file. The multimedia data is "activated" in response to branching means 32, such as by being applied to operate speech synthesizer 34. The data string after the special instruction is then directed toward the multimedia device such as speech synthesizer 34 and speaker 26. Thus, the function of branching means 32 is to temporarily "siphon off" the multimedia data which is embedded within the PDL file so that the multimedia data is sent to a multimedia device, and not sent to the printing apparatus.

Various systems for rendering a stream of binary data into audio signals for playback are commercially available. The multimedia data received by synthesizer 34 can be played over speaker 26 immediately, or may be temporarily stored for playback at an appropriate time. There may further be included provisions within control of system 16 for disabling the actual printing of the PDL file by the printer 14 until the multimedia data is played and heard by the printing machine operator. When the multimedia data character string within the PDL file is over with, there is preferably provided a separate return instruction indicating that everything after the instruction is more PDL data which should be applied to the compiler 28 and printing apparatus 14.

Figure 4:
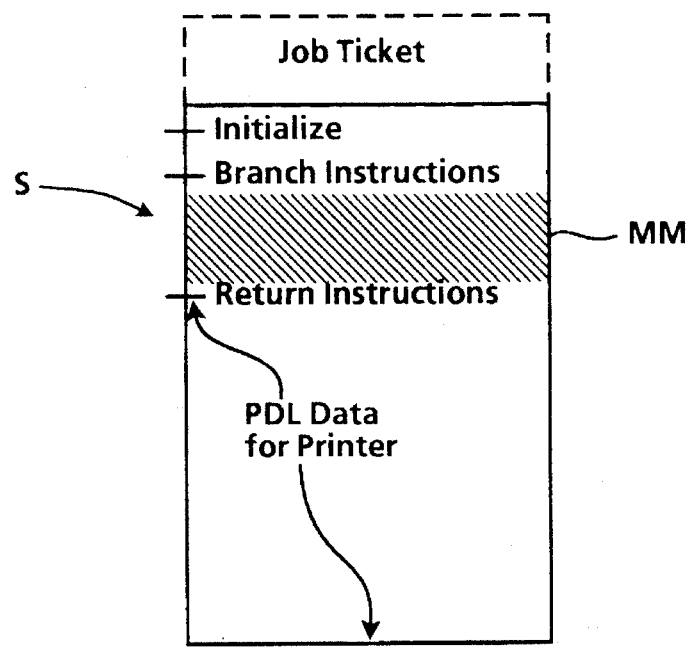
FIG. 4 is a diagram of a file in a page description language which is usable with one embodiment of the present invention.

FIG. 4 is a more detailed diagram of a data set S usable under the preferred embodiment of the invention. The data set S includes the job ticket, which is separated from the data set. At the top of the print data set, at the first line thereof, is an initialization or other set of instructions which are typical of various commercially-available page description languages, which appear at the beginning of a PDL file containing data to be printed. Preferably toward the beginning of the PDL file is a special instruction, to which the branching means 32 is sensitive. When this branch instruction within the PDL file is reached, the branching means 32 halts the compilation or loading of the PDL file into the printing apparatus 14, and instead redirects the multimedia data MM to the appropriate multimedia device 34 for playing. In terms of its appearance in the PDL file, the multimedia data looks like a long string of binary 1's and 0's, extending for 400 to 500 kilobytes per minute of audio. Thus, the multimedia data will be audio data which is embedded in a PDL file, as if it were a very long character string. At the end of the character string appears a return instruction, which signals to the branching means 32 to regard everything after the instruction as ordinary PDL file data. This PDL data for printer, which comprises the rest of the PDL file, is then applicable directly to the printing apparatus in a well-known manner.

While the invention has been described with reference to the structure disclosed, it is not confined to the details set forth, but is intended to cover such modifications or changes as may come within the scope of the following claims.

We claim:

1. A method of processing a job received at a processing station, the job comprising data to be processed, job ticket data, and a multimedia data set, comprising the steps of:

placing the job ticket data in a queue memory;

placing the data to be processed in a main memory;

transferring the data to be processed to the processing station in response to the job ticket data being activated in the queue memory; and activating the multimedia data set in response to the data to be processed being transferred to the processing station.

2. The method of claim 1, wherein the step of activating a multimedia data set includes accessing the multimedia data set from the job ticket data.

3. The method of claim 1, wherein the step of activating the multimedia data set includes accessing the multimedia data set from the data to be processed.

4. The method of claim. 3, further comprising the step of using a description language file as the data to be processed.

5. A method of processing a job received at a processing station, comprising the steps of:

placing job ticket data in a queue memory;

placing data to be processed in a main memory, the data to be processed being in a form of a page description language file;

transferring the data to be processed to the processing station in response to the job ticket data being activated in the queue memory;

activating a multimedia data set in response to the data to be processed being transferred to the processing station; and wherein the step of activating the multimedia data set includes accessing a data string within the page description language file in the data to be processed.

6. The method of claim 5, wherein the step of activating the multimedia data set includes accessing an instruction, associated with the data string, accessing a multimedia device.

7. A system for processing a job at a processing station, the job comprising data to be processed, job ticket data associated with the data to be processed, and a multimedia data set associated with the data to be processed, comprising:

a queue memory for storing job ticket data;

a main memory for storing data to be processed;

means for activating job ticket data from the queue memory in a sequence;

means for transferring the data to be processed to the processing station in response to the job ticket data associated therewith being activated in the queue memory;

a multimedia device; and means for activating the multimedia data set associated with the job in response to the data to be processed being transferred to the processing station.

8. The system of claim 7, wherein the job ticket data comprises the multimedia data set.

9. The system of claim 7, wherein the data to be processed comprises the multimedia data set.

10. The system of claim 7, wherein the data to be processed comprises a page description language file.

11. A system for processing a job at a processing station, the job comprising data to be processed and job ticket data associated with the data to be processed, and wherein the data to be processed comprises a page description language file, comprising:

a queue memory for storing job ticket data;

a main memory for storing data to be processed;.

means for activating job ticket data from the queue memory in a sequence;

means for transferring the data to be processed to the processing station in response to the job ticket data associated therewith being activated in the queue memory;

a multimedia device; and means for activating a multimedia data set associated with the job in response to the data to be processed being transferred to the processing station, the multimedia data set being at least partially in a form of a data string within the page description language in the data to be processed.

12. The system of claim 11, wherein the data to be processed includes an instruction, associated with the data string, accessing a multimedia device.

13. A method of processing data including a page description language file, comprising the steps of:

providing in the page description language file a data string operable of a multimedia device;

applying the data string to a multimedia device; and applying a portion of the data excluding the data string to a printing apparatus.

14. The method of claim 13, further comprising the step of applying the page description language file to a compiler.

15. The method of claim 14, further comprising the steps of:

providing a branch instruction in the page description language file associated with the data string; and applying the data string to the multimedia device in response to the branch instruction being detected by the compiler.

16. The method of claim 14, further comprising the steps of:

providing a return instruction in the page description language file associated with the data string;

deactivating the multimedia device with the data string when the return instruction is detected by the compiler; and applying data in the page description language file following the return instruction to a printing apparatus.

* * * * *